UNITED STATES PATENT OFFICE 1,923,756

MOLDING COMPOSITION AND A RESINOUS CONDENSATION PRODUCT RESULTING FROM ITS CONVERSION BY HEAT AND PRESSURE

Earl C. Sherrard and Edward Beglinger, Madison, Wis., dedicated to the free use of the Government and the People of the United States of America No Drawing. Application August 22, 1931
Serial No. 558,849

2 Claims. (Cl. 106—22)

(Granted under the Act of March 3, 1883, as amended April 30, 1928; 370 O. G. 757)

This application is made under the act approved April 30, 1928, and the invention herein described, if patented, may be manufactured and sold by or for the Government, for governmental purposes, without payment to us of any royalty thereon.

We hereby dedicate the invention herein described to the free use of the public to take effect upon the granting of a patent to us.

Our invention relates to a molding composition wherein vegetable fibrous material, more specifically wood, is incorporated with a phenolic substance and an acid catalyzer such as hydrochloric or sulphuric acid to form, with the application of heat and pressure, a hard resinous condensation product.

Unextracted vegetable fibrous material exhibits a suitable tendency toward complete resinification under conditions as described above, and gives satisfactory results in the production of a suitable resinous condensation product. We have found, however, that an improved resinous condensation product may be obtained if the fibrous material is first extracted with suitable solvents. The use of alcohol-benzol, ether, benzene and other solvents to partially or completely extract the fibrous material has been found to give desirable results. Following extraction the material is treated with phenol and an acid catalyzer and subjected to heat and pressure as previously described.

It is the object of this invention to use finely-ground, vegetable fibrous material, or that which has been made partially or wholly extractive-free through the use of solvents such as ether, benzene, and the like, where a more intimate contact of a phenolic substance and ligno-cellulose is made possible.

It is not our intention to limit ourselves to a given extractive content value in the extracted vegetable fibrous material or to one particular temperature or pressure or concentration of ingredients when molding or forming a mixture to produce the resinous condensation product.

An example covering the procedure in the preparation of the ingredients and the pressing, forming, or molding of the mixture is as follows:

To one hundred parts of finely-ground, maple sawdust are added 0.3 part of hydrochloric acid and 10 parts of phenol. After thorough stirring the mixture is transferred to a steam mold, subjected to a pressure of 3500 pounds per square inch and a temperature of 120° C. for 20 minutes; under which conditions a reaction takes place resulting in the formation of a hard, resinous condensation product.

We claim:

1. A molding composition comprising finely ground wood, phenol and a mineral acid.

2. A molding composition comprising partially extracted finely ground wood, phenol, and a mineral acid.

EARL C. SHERRARD.
EDWARD BEGLINGER.